Figure 1:
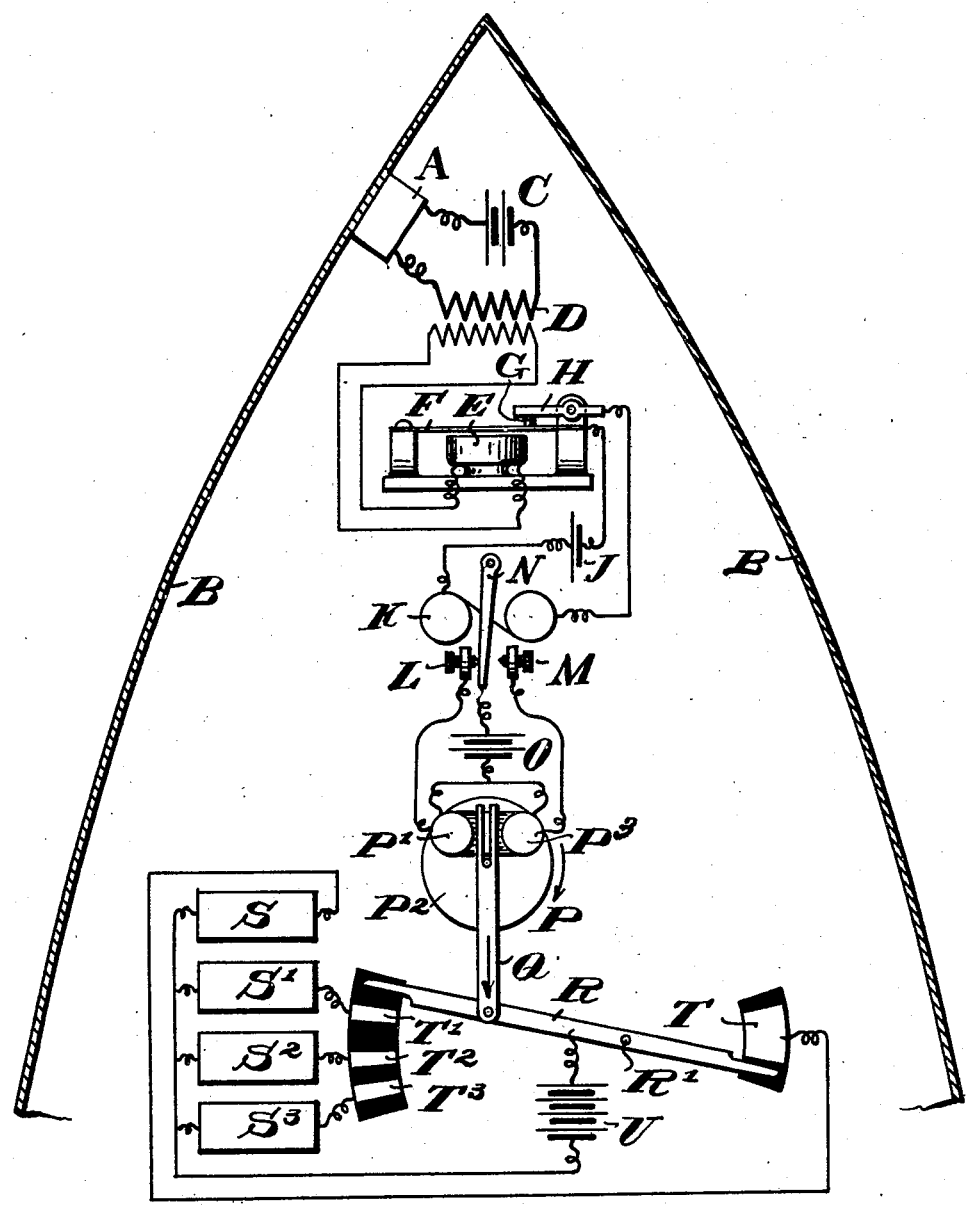

J. GARDNER.
MEANS FOR SIGNALING OR EFFECTING OPERATIONS BY MEANS OF SOUND VIBRATIONS.
APPLICATION FILED MAY 4, 1907.

913,372.

Patented Feb. 23, 1909.
3 SHEETS—SHEET 1.

Witnesses:
Waldo M. Chapin
James D'Antonio

Inventor:
John Gardner.
by Rosenbaum & Stockbridge
Attys.

J. GARDNER.
MEANS FOR SIGNALING OR EFFECTING OPERATIONS BY MEANS OF SOUND VIBRATIONS.
APPLICATION FILED MAY 4, 1907.
913,372.
Patented Feb. 23, 1909.
3 SHEETS—SHEET 2.
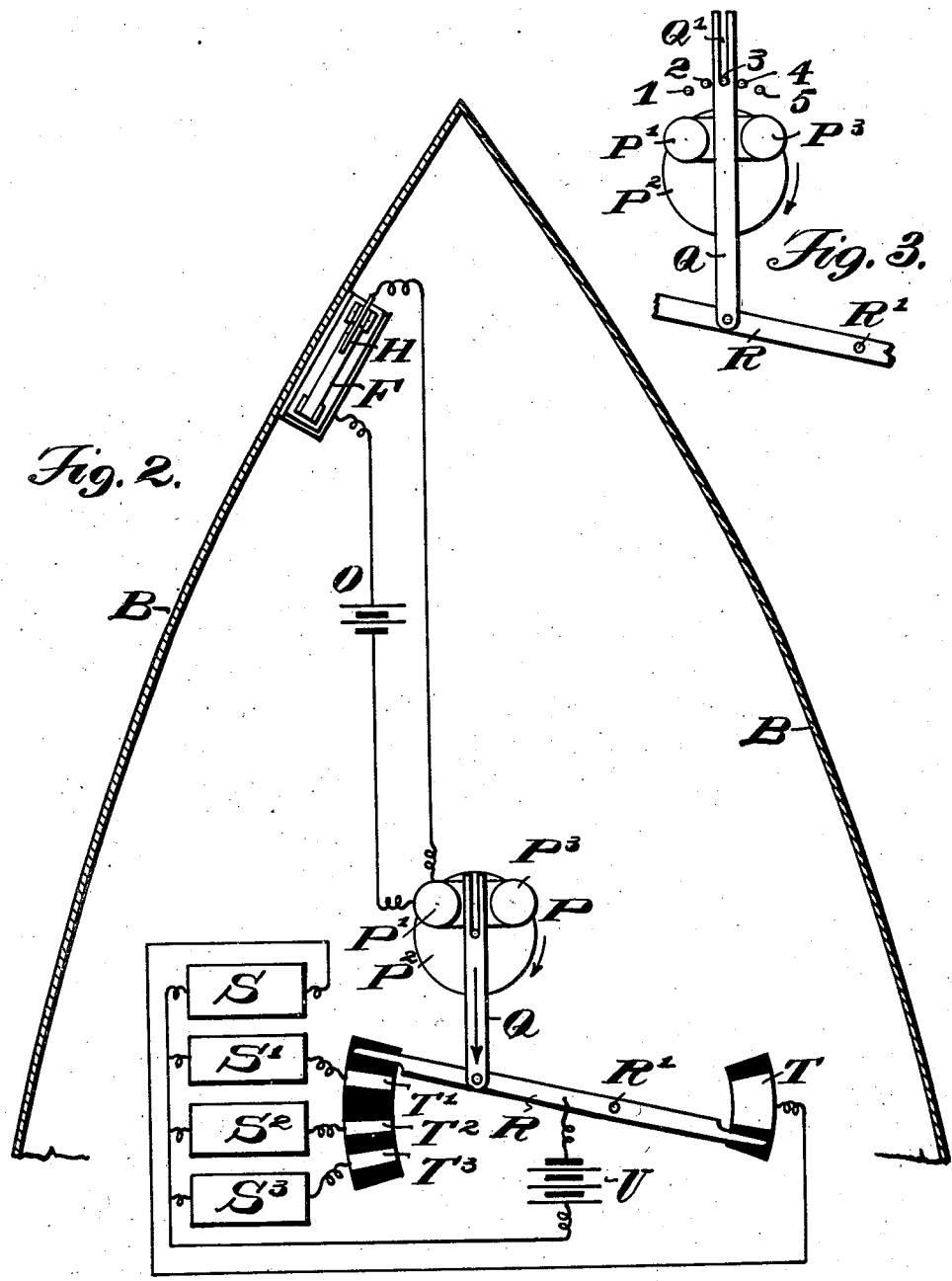
Witnesses:
Waldo M. Chapin
James D'Antonio
Inventor:
John Gardner
by Rosenbaum & Stockbridge
Attys.

J. GARDNER.
MEANS FOR SIGNALING OR EFFECTING OPERATIONS BY MEANS OF SOUND VIBRATIONS.
APPLICATION FILED MAY 4, 1907.

913,372.

Patented Feb. 23, 1909.
3 SHEETS—SHEET 3.

Witnesses:
Waldo M. Chapin
James D'Antonio

Inventor:
John Gardner.
by Rosenbaum Stockbridge
Attys.

UNITED STATES PATENT OFFICE.

JOHN GARDNER, OF KNOTT END, NEAR FLEETWOOD, ENGLAND.

MEANS FOR SIGNALING OR EFFECTING OPERATIONS BY MEANS OF SOUND-VIBRATIONS.

No. 913,372. Specification of Letters Patent. Patented Feb. 23, 1909.

Application filed May 4, 1907. Serial No. 371,805.

*To all whom it may concern:*

Be it known that I, JOHN GARDNER, a subject of the King of Great Britain and Ireland, and a resident of Knott End, near Fleetwood, in the county of Lancaster, England, have invented a new and useful Means for Signaling or Effecting Operations by Means of Sound-Vibrations, of which the following is a specification.

These improvements relate to appliances for giving a signal or effecting the control of multiple apparatus at a receiving station as a consequence of the arrival at such receiving station of sound vibrations or waves conducted through water from the transmitting or controlling station. Either directly or through interposed instruments such sound waves set up vibrations at a microphonic loose contact which is included in the same electric circuit as a source of current and an electro magnetic device. The microphone or equivalent loose contact is so disposed and arranged that when quiescent and in its normal state as in the absence of vibrations resulting from sound, the maximum amount of current is flowing through it and through the connected electro-magnetic device so as to normally hold the movable part of such electro-magnetic device in such a position against the influence of a spring, weight, or the like that it is inoperative. Upon the arrival of the sound vibrations for which a signal is to be given or which are to control an operation, and the consequent vibration or movement set up at the microphone contact, the circuit containing this contact opens or has its resistance increased so that less or no current flows through the electro-magnetic device and its movable part is released and moves to close or otherwise affect a local electric circuit containing the instrument or apparatus to be affected or controlled. An electric circuit governed according to this invention is therefore normally closed, and as the contacts at which a variation of condition takes place are ordinarily touching each other, separating or partly separating only on the arrival of a sound and their consequent vibration thereby, the difficulty of adjusting moving contacts operated by minute vibrations is avoided. The result is that certainty of control of a circuit is secured with an amplitude of contact movement too small to be discerned with a powerful glass, while the contacts are self-adjusting by gravity or spring. The vibrations which operate the microphone contact are the sound vibrations which are set up in submarine sound signaling, and the devices which are hereinafter described are employed at a receiving station such as a ship or other vessel, although land receiving stations may be similarly equipped and operated.

The microphone contact may itself directly receive and be operated or vibrated by sounds upon the occurrence of which a signal is desired. Such signal may be given upon the arrival of any sound vibrations which are sufficient to vibrate the microphone contact, but in order to prevent interference it is preferred to mount the microphone contacts upon a tuned box, air column, a tuned reed, or other resonator which will only respond and vibrate and throw the microphone contacts into vibration upon the arrival of vibrations having a periodicity corresponding to the natural period of vibration of the resonator. Or the microphone contacts may be attached to or be operated by the diaphragm of a telephonic receiver which is itself in electric circuit with a telephonic transmitter at the receiving station and by which all arriving sounds are received. The telephonic receiver may have an ordinary diaphragm so that the attached microphone contacts will be vibrated whenever any sounds of sufficient amplitude are received and transmitted by the transmitter, but it is preferred to form it with a diaphragm or equivalent which is capable of being tuned so as to respond only to a certain note or sound and not to be affected by other sounds which reach the transmitter.

With the resonator or the tuned telephonic receiver it is only on the occurrence and arrival of the predetermined sound that the microphone contacts are vibrated and the signal given.

The devices employed may be utilized to give a simple signal upon the arrival of sound; to give a code signal upon the arrival of successive sounds; or to effect control of a multiplicity of operations in the manner hereinafter more fully described.

The microphone contact device is preferably so mounted upon felt or other equivalent substance as to be isolated from vibrations set up in the station in which it is fixed.

The accompanying drawings, to which reference will be hereinafter made, illustrate how my improvements may be carried into effect.

Figure 4:
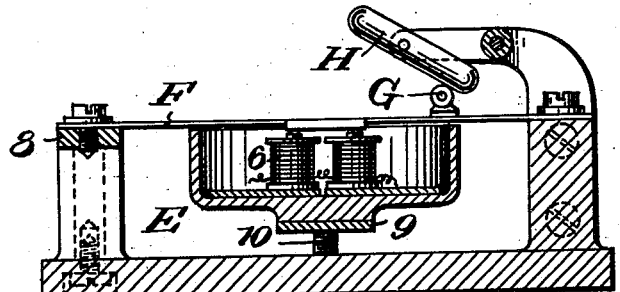
Figure 5:
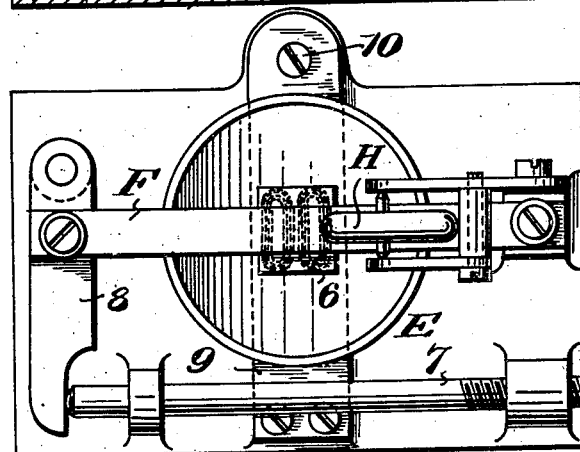
Figure 6:
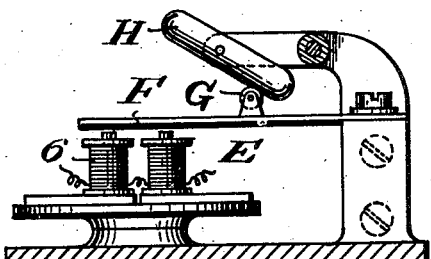
Figure 7:
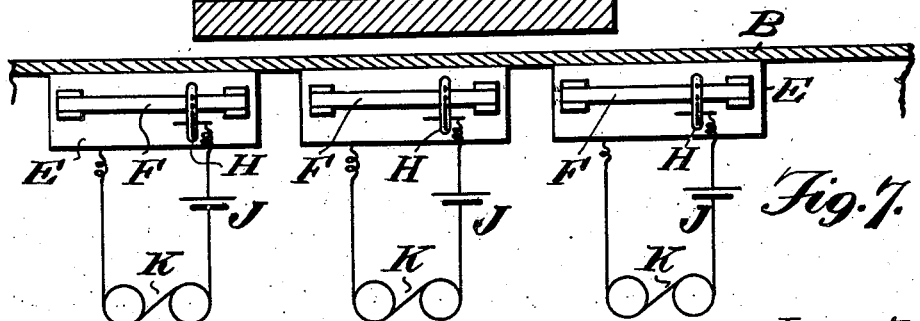

Figure 1 illustrates the application to a torpedo or the like of devices by which its operation, direction, and explosion or the like can be governed by sound from a distant station or ship. Fig. 2 shows a modification of the same arrangement. Fig. 3 illustrates a detail of the device by which the multiplicity of operations is directly effected. Figs. 4 and 5 show in vertical section and in plan respectively a form of microphone contact device mounted upon a selective telephonic receiver or equivalent. Fig. 6 represents a modification of the device shown in Figs. 4 and 5. Fig. 7 illustrates another arrangement of devices for governing or controlling a multiplicity of operations at the receiving station.

Referring to Fig. 1, A indicates a receiving telephonic transmitter which may be constructed and disposed within or upon the shell of a vessel B in such a way as to receive arriving sound vibrations and as is well understood in submarine sound signaling. This transmitter is in circuit with a source of current C and the primary of an induction coil D, the secondary of which is in circuit with an electro-magnetic device E which may be of the type of a telephonic receiver and over the magnets of which a tuned reed or magnetic strip F is placed. Such strip will only vibrate adequately when the periodicity of the magnetic undulations imparted to the magnets in E by the transmitter corresponds to the natural period of vibration of the strip.

The construction and arrangement of the electro-magnetic device is more clearly shown in Figs. 4, 5, and 6. The vibrating strip has connected to it one electrode G of a microphonic contact, and upon this electrode rests the other and pivoted electrode H, both preferably being of carbon and both being in circuit with a source of current J and a high resistance relay K, preferably polarized. This relay has two contact stops L, M, either of which may be placed, through the tongue N, in circuit with the source of current O and one or other of the magnets of the disk and clutch device P, which is of the type fully described in the specification to my former British patent No. 20,496 of 1904. Q is the movable part of the clutch and has attached to it an electric switch or the like R according to the position of which various electro-magnetic devices indicated at S, S$^1$, S$^2$, S$^3$, are operated. The method of operation of the disk and clutch is fully described in my said patent.

When the transmitter is not receiving any sound or the sounds received by it have not the periodicity to operate the telephonic device, the strip F is at rest and the electrodes of the attached microphonic contacts maintain a constant closed circuit and the tongue N of the relay is held over by the constant current against the contact L, and the current from O passes through the magnet P$^1$ on the clutch device, this magnet being thus energized and by its engagement with the rotating disk P$^2$ holding the movable part Q against the stop in the position indicated in Fig. 1. Should sounds arrive at the transmitter which are capable of vibrating the strip F, the microphone contacts are vibrated and their resistance increased, and the pull of the hitherto operative magnet upon the relay tongue is relaxed, and the tongue is moved over to come into contact with the contact M against which it remains (being sufficiently sluggish in its movements) as long as the sound persists. While the tongue is over in its latter position the current is cut off from the magnet P$^1$ in the clutch and is passed through the magnet P$^3$. As soon as this magnet is energized and engages with the disks P$^2$, the movable part Q is moved in the direction of the straight arrow and the extent of its movement depends upon the length of time for which the circuit of the magnet P$^3$ remains closed, as a consequence of the length of time for which the microphonic contacts are vibrated and the relay tongue remains in contact with the stop M.

When the movable part is moved the switch R also moves angularly around its pivot R$^1$. With the devices shown and as supposed to be applicable to controlling a locomotive torpedo from a ship or station within sound range, the first movement of the switch R from the position indicated under the thrust of the movable part Q brings its end upon the plate T and closes the circuit containing the source of current U and the electro-magnetic device S, which is the motor for propelling the torpedo. A further movement of the movable part Q and the switch R brings the latter into contact with the plate T$^1$ and closes the circuit passing through S$^1$, the propeller motor circuit still remains closed owing to the length of the plate T. Further movements of the movable part and the switch bring the latter successively upon plates T$^2$ T$^3$, and successively close the circuits containing either S$^2$ S$^3$, the propelling circuit remaining closed. The devices contained in S$^1$ S$^2$, S$^3$, may, for example, be respectively for operating the rudder to port, to starboard, and for exploding the charge. Any of the operations in S, S$^1$ etc., may be directly performed by currents from the contacts T T$^1$ etc., or indirectly through motors or relays.

The rate of succession and the resistance of the operative sounds arriving at the transmitter A determine the position of the switch. This movement of a movable part and the control of different members is not in itself new and is not herein claimed by itself.

When the sounds cease for a sufficient length of time the tongue of the relay returns to the contact L and the magnet P¹ is again energized to return the movable part Q and the switch R towards or to the position shown in Fig. 1, the magnet P³ being cut out.

In the modification shown in Fig. 2 the same switch R and its accessory devices are shown, as is also the disk and clutch apparatus P, but the latter is now shown as operated directly from the microphonic contacts without the intervention of a relay, and the microphonic contacts are shown as being operated directly by the arriving sound vibrations without a receiving transmitter and the electro-magnetic devices for operating them. The microphonic contact device, (one of the electrodes of which is shown at H) is mounted or disposed similarly to the transmitter A for the reception of sound. It is attached to or forms part of a resonator which may consist simply of a tuned reed or strip F by itself, or the tuned reed or strip may be attached to or be in vibratory contact with a sounding board or air containing column or other resonator which may be tuned by having its capacity varied as desired. In any case the strip will only adequately vibrate upon the arrival of the desired sound. When the strip vibrates the resistance of the microphone contact circuit is increased. With the arrangement shown and with the microphone contacts at rest the current from O passes through the closed microphone contact circuit and through the magnet P¹ of the clutch P, the other magnet of which, P³, is in this case a permanently energized magnet. With the current flowing through P¹ this magnet is energized to an extent to overcome the pull of the permanent magnet P³, and magnet P¹ by its superior engagement with the rotating disk P² holds the movable part Q against a stop in the position shown in Fig. 2. When the microphone contacts are vibrated owing to the arrival of operative sounds, the resistance of the circuit is increased, the pull of the manget P¹ is reduced until it falls below that of the permanent magnet P³, and the latter being now the stronger pushes the movable part in the direction of the straight arrow. The movement of the movable part operates the switch R as before. The extent of movement of the movable part depends upon the persistence of the operative vibrating sounds received at F.

It is obvious that the microphone contact circuit may contain any other electro-magnetic device which is adapted to move upon a diminution of current or increase of resistance and that such electro-magnet device may effect any desired operation such as ringing a bell or blowing a whistle or exhibiting or extinguishing a light, and that the relay and clutch when used may be employed for giving similar signals. It is also obvious, if the microphone contacts were mounted upon a strip, diaphragm or the like which would vibrate in response to any sound or any range of sounds, that upon the occurrence of any such sound having the requisite amplitude the microphone contacts would vibrate and the signal be given.

Fig. 3 shows an arrangement by which the magnets P¹ and P³ may be moved laterally over the rotative disk P² so as to vary the ratio of advance and return of the movable part Q. For this purpose the movable part Q to which the magnets are attached has its end slotted as at Q¹ and this slot may be placed so as to engage with any one of a series of pins 1, 2, 3, 4, 5, fixed to the frame of the clutch. The movable part is capable of sliding longitudinally when in engagement with any one pin. The effect of altering the position of the magnets and the attached movable part is fully described in my said British Patent No. 20496 of 1904.

For effecting multiple control any slow moving part which is capable of being held in a constant inoperative position when the microphone contact circuit is closed, and which will slowly move when the resistance of the circuit increases may be used instead of the clutch P shown and described, if it fulfils the conditions of moving a distance (against or under a magnetic pull, weight, resistance, or equivalent) which is proportionate to the time for which the microphone contacts are vibrated, and such slow moving part may be included either directly in the microphone contact circuit or in a local circuit operated from the microphonic contact device.

It is preferred in any case that only a very weak current be employed in the microphone contact circuit so as to avoid burning and other disturbance of contacts when the microphone contacts are not operated.

Figs. 4, 5, and 6 illustrate tuned telephonic or equivalent devices E which are placed in circuit with a sound receiving transmitter, and have microphone contacts disposed upon the selective strips. Such selective telephonic receivers are not claimed herein per se, and the particular disposition and arrangement of the microphonic contacts are not herein claimed, but are only described and illustrated as the best and most sensitive at present known to me. In Figs. 4 and 5 usual telephonic coils and magnets are indicated at 6, the former being in circuit with the receiving transmitter in the usual manner. F is the selective tunable magnetic strip or armature disposed closely above the magnet poles but so as to be capable of vibration, and capable of having its tension varied so that its pitch or natural period of vibration may be varied through the screw 7 and lever 8. The magnets are mounted upon a stiff spring 9 whose natural tendency is to rise. By means of the screw 10 which engages with one end of the spring the distance between the magnet poles and the strip F may be varied at will. The electrodes G and H of the microphonic device are in circuit as described with reference to Figs. 1 and 2. Fig. 6 shows a variation in form of a selective device operable from a transmitter, the variable tension strip F shown in the two preceding figures being replaced by a magnetic strip or reed F fixed at one end only. This strip has a natural period of vibration and may be replaced by a reed having any other pitch when it is desired to vary the responsivity of the instrument. The magnets shown in Fig. 6 may be permanent magnets bearing coils as in a telephone receiver or they may be simple electro-magnets as may also the magnets in the instruments previously described.

As previously indicated the selective strip may be substituted by an ordinary diaphragm so that the microphone contacts are operated by any sound of sufficient intensity or amplitude arriving at the transmitter.

Fig. 7 indicates how a multiplicity of operations at the receiving station may be performed, or a variety of distinctive signals given without the slow moving part previously described, by having a number of electric circuits each containing its own operating device, and each also containing a microphone contact device which is operated by or in conjunction with a receiver or equivalent resonator which is only responsive to one note. Any particular operating device is then thrown into action or signal given when its appropriate sound or note reaches its included microphone contact. The microphone contact may be arranged to directly receive the sounds, as already described with reference to Fig. 2, or may be separately operated by separate transmitters as described with reference to Fig. 1. Or one receiving transmitter may have all the different telephonic microphone vibrators in parallel circuit with it. In Fig. 7 are three different microphone vibrators of the type shown in Fig. 2, each being responsive to one note only, and which note is different to the notes to which its neighbors are responsive. Included in each microphone vibrator circuit is a relay K or other device capable of effecting a desired signal or operation. Should the sound which is to operate any one microphone contact arrive, that microphone contact will vibrate and give a signal or effect an operation, even although other and obscuring or interfering sounds are simultaneously arriving. Thus by sending the proper operating sounds in the desired sequence or simultaneously from the sending station any desired operations or signals may be effected or given at the receiving station. Or the devices described will indicate what particular note or notes has or have been received.

Other electro-magnetic devices than those described may be included in the microphone contact circuit and be operated upon the reduction of current or increase of resistance in the microphone contact circuit as the microphone contacts vibrate to control a local circuit containing the signaling or other instrument, or other devices capable of having their conditions or state altered upon such reduction of current or increase of resistance may be included.

With the selective devices hereinbefore described the instruments may be adapted to pick up and respond to any desired or predetermined sound.

The sending station is equipped as is usual in submarine sound signaling, and has several sound emitting devices of different pitch when it is desired to separately influence different receiving instruments or stations at will.

With one signaling station capable of sending out various notes several receiving stations may be combined. When each such receiving station has a separate and different sound receiving instrument the one sending station may communicate with all of them at the same time without one receiver station being interfered with by the sounds destined for another receiving station.

For ordinary submarine sound signaling, as in communicating with a ship from a lighthouse or lightship, the above described appliances and method possesses great advantages. After the signal has been given as by ringing a bell or blowing a whistle or in other fashion, by an instrument included in a local circuit controlled from the microphonic circuit indicating that the vessel is within range of a sound generating station, the officer in charge may then listen at an ordinary telephonic receiver or ordinary receivers which may be permanently in circuit with the sound receiving transmitter or be switched into circuit when required, so that he can then ascertain the bearing of the sound generating station in the manner at present usual in such submarine signaling. It is evident of course that the receiving transmitters may be arranged as desired and as is known for the purpose of assisting in this operation.

I claim:—

1. Sound signaling apparatus comprising in combination a sound receiving transmitter, a telephonic receiver in circuit therewith, a tuned diaphragm therefor, microphonic contacts upon and operable by the said diaphragm and in a normally closed electric circuit, a device included in such circuit and having a movable part which moves when the contacts are vibrated and the current is consequently reduced, a local electric circuit, and a signaling instrument contained in the local circuit, such local circuit being controlled by said movable part to affect the signaling instrument upon and during the persistence of the microphonic vibrations, as herein set forth.

2. Sound signaling apparatus comprising in combination a sound receiving transmitter, a telephonic receiver in circuit therewith, a tunable diaphragm therefor, microphonic contacts upon and operable by said diaphragm and in a normally closed electric circuit, a device included in said circuit and having a movable part which moves when the contacts are vibrated and the current is consequently reduced, a local electric circuit, and a signaling instrument contained in said local circuit, such local circuit being controlled by the said movable part to affect the signaling instrument upon and during the persistence of the microphonic vibrations, as herein set forth.

3. Sound signaling receiving apparatus for effecting multiple control at the receiving station, comprising in combination a sound receiving transmitter, a telephonic receiver in circuit therewith, microphonic contacts upon and operable by the receiver diaphragm and in a normally closed electric circuit, a device having a movable part which moves over and remains over in its moved position to close a local electric circuit when the microphonic contacts are vibrated and the current is consequently reduced, the said local circuit, an electro-magnetic device inclosed in such local circuit and having a slowly moving part, a switch controlled by such slowly moving part, and various further local circuits containing the apparatus to be operated and controlled by the said switch, all as hereinbefore described.

4. Sound signaling apparatus for effecting multiple control at the receiving station, comprising in combination a resonator, microphonic contacts mounted thereon and in a normally closed electric circuit, an electro-magnetic clutch device also in the electric circuit and provided with a slowly movable part which is operated when the microphonic contacts are vibrated and the current is consequently reduced, a switch controlled by said movable part, and various local electric circuits containing the mechanism to be operated and controlled by the said switch, as herein set forth.

5. Sound signaling receiving apparatus for effecting multiple control at the receiving station, comprising in combination two or more differently tuned resonators, microphonic contact devices mounted upon such resonators and included in normally closed electric circuits, and devices included in such electric circuits and having movable parts to effect the desired multiple controls, as herein set forth.

In witness whereof I have hereunto set my hand in the presence of two subscribing witnesses.

JOHN GARDNER.

Witnesses:
 WILLIAM GEO. HEYS,
 J. O'CONNELL.